(12) United States Patent
Bae (10) Patent No.: US 8,007,988 B2
(45) Date of Patent: Aug. 30, 2011

(54) METHOD FOR MANUFACTURING LENS FORMING MASTER AND METHOD FOR MANUFACTURING THIN FILM TRANSISTOR SUBSTRATE USING THE SAME

(75) Inventor: Jung-Mok Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 801 days.

(21) Appl. No.: 12/034,983

(22) Filed: Feb. 21, 2008

(65) Prior Publication Data

US 2008/0268378 A1    Oct. 30, 2008

(30) Foreign Application Priority Data

Apr. 26, 2007    (KR) .......................... 10-2007-0040811

(51) Int. Cl.
*G02F 1/1335* (2006.01)

(52) U.S. Cl. ........................... 430/321; 430/945; 264/2.5

(58) Field of Classification Search ........................ None
See application file for complete search history.

(56) References Cited

U.S. PATENT DOCUMENTS

2003/0048399 A1* 3/2003 Okumura ...................... 349/113
2006/0281204 A1* 12/2006 Chang et al. .................... 438/22

FOREIGN PATENT DOCUMENTS

| JP | 9297940 | 11/1997 |
| JP | 2005201933 | 7/2005 |
| KR | 1020050094030 | 9/2005 |

* cited by examiner

*Primary Examiner* — John A. McPherson
(74) *Attorney, Agent, or Firm* — H.C. Park & Associates, PLC (57) ABSTRACT

A method for manufacturing a lens forming master includes coating an organic insulation material on a substrate to form an organic insulation layer, removing a portion of the organic insulation layer with a laser which is irradiated through a first mask to form a lens shape on a surface of the organic insulation layer, and removing portions of the organic insulation layer with a laser irradiated through a second mask to form a contact hole and a bank area in the organic insulation layer.

9 Claims, 13 Drawing Sheets

METHOD FOR MANUFACTURING LENS FORMING MASTER AND METHOD FOR MANUFACTURING THIN FILM TRANSISTOR SUBSTRATE USING THE SAME

CROSS-REFERENCE TO RELATED APPLICATIONS

This application claims priority from and the benefit of Korean Patent Application No. 10-2007-0040811, filed on Apr. 26, 2007, which is hereby incorporated by reference for all purposes as if fully set forth herein.

BACKGROUND OF THE INVENTION

1. Field of the Invention

The present invention relates to a liquid crystal display ("LCD") apparatus. More particularly, the present invention relates to a method for manufacturing a lens forming master used in manufacturing a transflective LCD apparatus and a method for manufacturing a thin-film transistor ("TFT") substrate using a lens forming master.

2. Discussion of the Background

In general, a liquid crystal cell in an LCD panel adjusts a light transmission ratio according to a data signal, thereby displaying an image.

The LCD apparatus includes a transmissive type and a reflective type. The transmissive LCD displays an image using light that is irradiated from a backlight unit, and the reflective LCD displays an image by reflecting peripheral light, such as natural light. The transmissive LCD uses an additional rear-surface light source, so that a bright screen can be implemented even in a dark external environment, but power consumption is greater than with the reflective LCD. The reflective LCD consumes less power than the transmissive LCD because it uses peripheral light, but the reflective LCD apparatus can not be used in the dark.

Thus, a transflective LCD apparatus that can properly switch between two modes according to required conditions has been developed. The transflective LCD apparatus operates in a reflective mode when peripheral light is sufficient and operates in a transmissive mode using a backlight as a rear-surface light source when the peripheral light is not sufficient.

The transflective LCD apparatus includes a reflective area and a transmissive area. Peripheral light irradiated at various angles is condensed into a view angle in the reflective area, and rear-surface light provided from the backlight unit exits through a liquid crystal layer in the transmissive area.

The reflective area of the transflective LCD apparatus includes a protective surface. A lens for condensing the incident peripheral light into a user viewing angle is formed on the protective surface. The lens, which may have a complex shape, such as a fine shape or an asymmetric shape, improves the reflective ratio in the reflective area. However, a photolithography method for forming the lens in the protective layer of the transflective type LCD apparatus is limited with regard to lens shape, uniformity of processes, and reproducibility.

When a shape of a complex lens is formed by a conventional photolithography method, exposure processes may be increased and an expensive half-tone mask may be needed. Moreover, when the shape of the complex lens is formed by the conventional photolithography method, process parameters, such as the thickness of the protective layer and the amount of exposure, may be difficult to control, but should be controlled to assure process uniformity and reproducibility.

SUMMARY OF THE INVENTION

The present invention provides a method for manufacturing a lens forming master that may be used to more easily form a complex lens shape on a protective layer.

The present invention also provides a method for manufacturing a thin-film transistor ("TFT") substrate using a lens forming master.

Additional features of the invention will be set forth in the description which follows, and in part will be apparent from the description, or may be learned by practice of the invention.

The present invention discloses a method for manufacturing a lens forming master including coating an organic insulation material on a substrate to form an organic insulation layer, removing a portion of the organic insulation layer with a laser that is irradiated through a first mask to form a lens shape on the surface of the organic insulation layer, and removing portions of the organic insulation layer with a laser irradiated through a second mask to form a contact hole and a bank area in the organic insulation layer.

The present invention also discloses a method for manufacturing a lens forming master including coating an organic insulation material on a substrate to form an organic insulation layer, performing a photolithography process using a first mask to form a contact hole and a bank area in the organic insulation layer, and removing a portion of the organic insulation layer by a laser irradiated through a second mask to from a lens shape on a surface of the organic insulation layer. The first mask includes patterns corresponding to the contact hole and the bank area.

The present invention also discloses a method for manufacturing a TFT substrate removing a portion of an organic insulation layer by a laser irradiated through a mask to form a lens forming master having a lens shape on a surface of an organic insulation layer, coating and hardening an elastic material on the surface of the organic insulation layer to form an imprinting mold having the lens shape on the surface of the organic insulation layer, and compressing and hardening the imprinting mold on the TFT substrate having the protective layer to imprint the lens shape formed on the surface of the organic insulation layer of the lens forming master on a protective layer.

It is to be understood that both the forgoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE
ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" or "connected to" another element, it can be directly on or directly connected to the other element or intervening elements may also be present. In contrast, when an element is referred to as being "directly on" or "directly connected to" another element, there are no intervening elements present.

Figure 1:
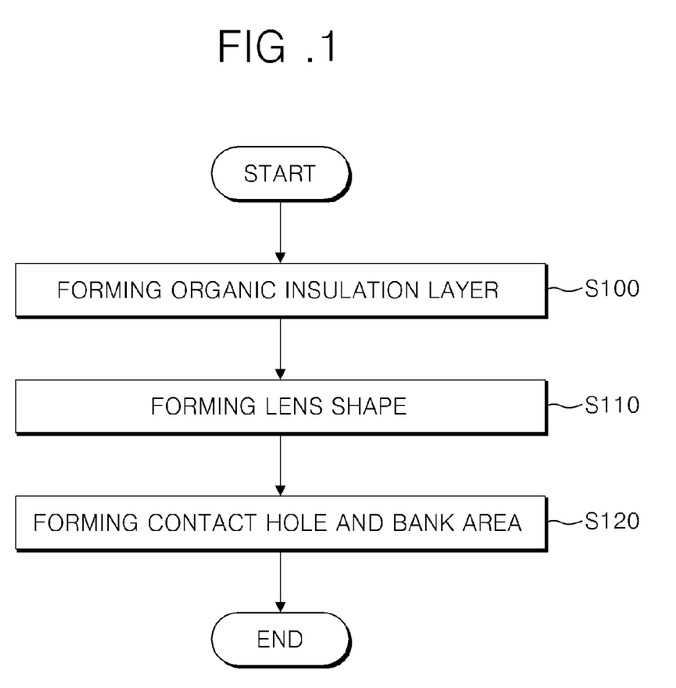
FIG. 1 is a flow chart showing a method for manufacturing a lens forming master in accordance with a first exemplary embodiment of the present invention.

As shown in FIG. 1, the method for manufacturing a lens forming master according to a first exemplary embodiment of the present invention includes forming an organic insulation layer S100, forming a lens shape S110, and forming a contact hole and a bank area S120. A master is a circle plate used to manufacture an imprinting mold. Moreover, the imprinting mold is a mold for imprinting a lens shape on a surface of the protective layer in a reflective area of a transflective LCD apparatus.

Figure 2A:
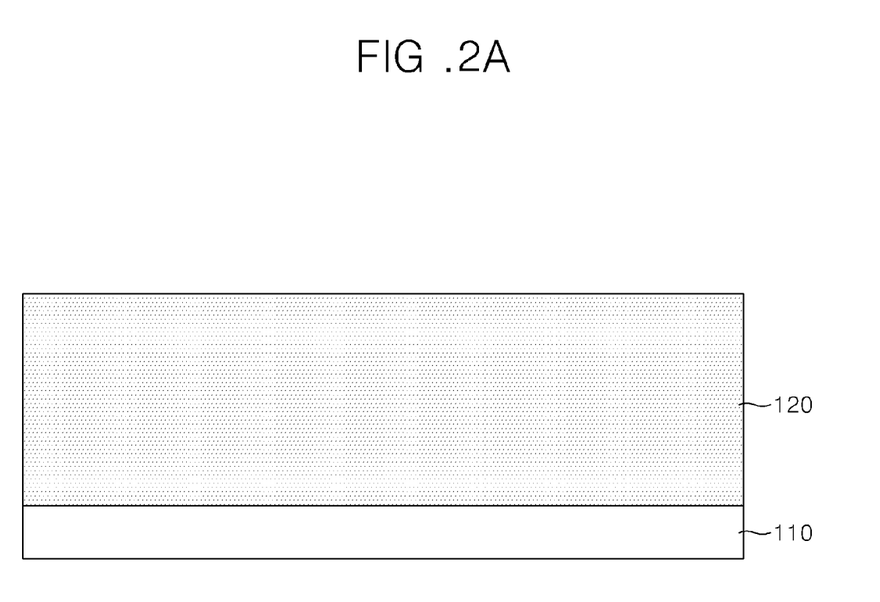
FIG. 2A, FIG. 2B, and FIG. 2C are cross-sectional views showing the method for manufacturing the lens forming master in FIG. 1.

As shown in FIG. 2A, forming the organic insulation layer includes coating an organic insulation material on a substrate 110 to form an organic insulation layer 120. A spin coating method or a slit coating method may be used to coat the organic material on the substrate 110.

The ablation rate, which is the ratio of organic insulation material removed by a laser, may be measured accurately, so that a final pattern shape may be presumed according to a laser power and a mask shape.

Figure 2B:
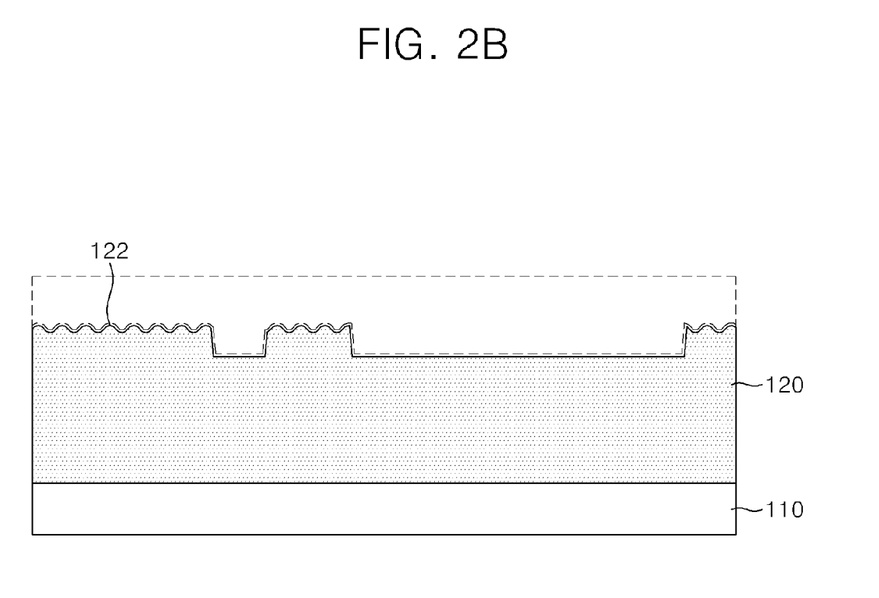

As shown in FIG. 2B, forming the lens shape includes removing a surface of the organic insulation layer 120 using a laser that is irradiated through a mask to form a lens shape 122 on the surface of the organic insulation layer 120. The surface of the organic insulation layer 120 on which the lens shape 122 is formed corresponds to a surface part of a protective layer in the reflective area of the transflective type LCD apparatus. The area with a dotted line denotes the organic insulation material removed by the laser.

A half-tone mask method or a synchronized imaging system method may be used in forming the lens shape 122. A method using a laser provides for an area where the uniformity of laser intensity is maintained that is smaller than that of a conventional photolithography process. Thus, a repeated pattern of the lens shape 122 may be formed on the surface of the organic insulation layer 120 in a step and repeat method.

Figure 2C:
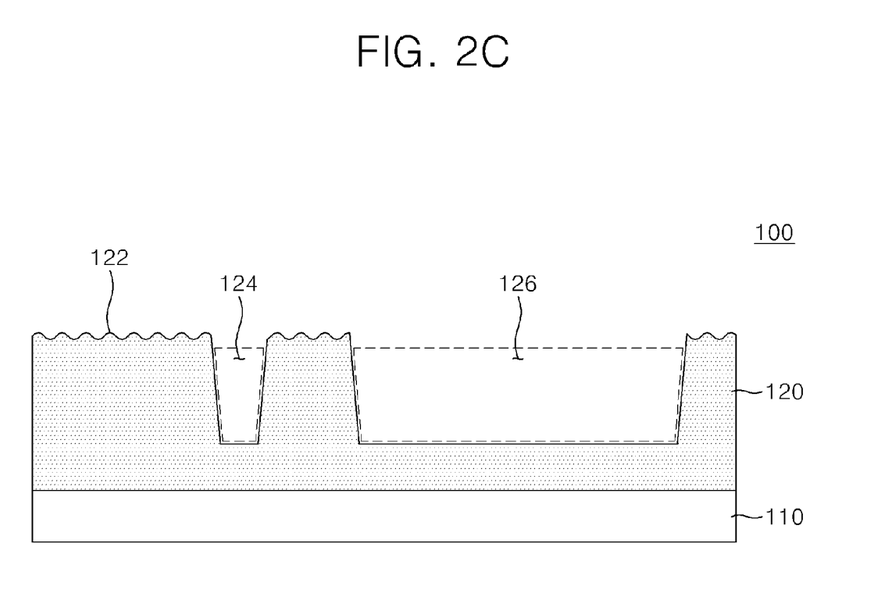

As shown in FIG. 2C, forming the contact hole and the bank area includes removing the organic insulation layer 120, on which the lens shape 122 is formed, using a laser irradiated through a mask to form the contact hole 124 and the bank area 126. The contact hole 124 formed in the organic insulation layer 120 provides a course to connect a drain electrode of the TFT and a pixel electrode of the transflective LCD apparatus. The bank area 126 formed in the organic insulation layer 120 is formed at the protective layer of the transmissive area of the transflective LCD apparatus. The area with a dotted line denotes the organic insulation material removed by the laser.

Forming the contact hole and the bank area S120 may include a half-tone mask method or a synchronized imaging system method that is substantially the same as that used in forming the lens shape S110.

The lens forming master 100 may be manufactured on the surface of the organic insulation layer 120 by forming an organic insulation layer S110, forming a lens shape S100, and forming a contact hole and a bank area S120.

Figure 3A:
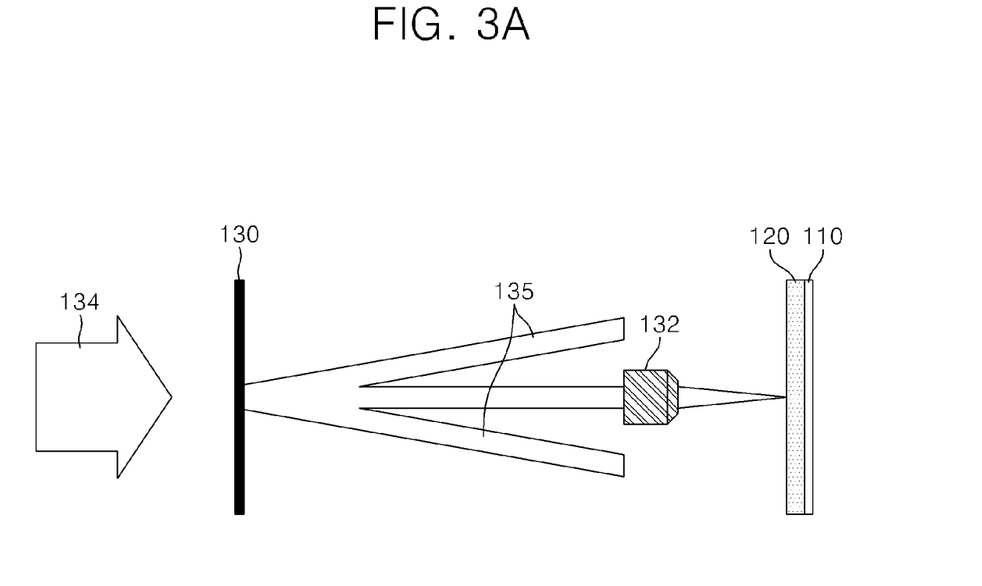
FIG. 3A, FIG. 3B, and FIG. 3C are schematic side views showing a half-tone mask method used in forming the lens shape in FIG. 1.
Figure 3B:
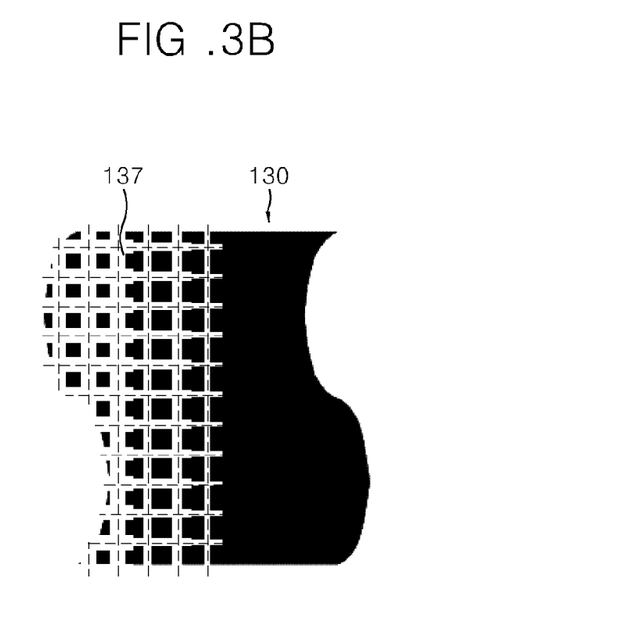
Figure 3C:
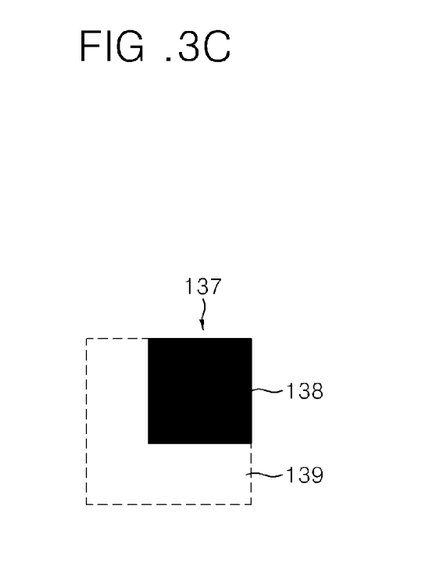

FIG. 3A, FIG. 3B, and FIG. 3C are schematic side views showing a half-tone mask method used in the step of forming the lens shape S110 of FIG. 1. As shown in FIG. 3A, in the half-tone mask method, a laser 134 irradiated through a half-tone mask 130 is irradiated through a focus lens 132 onto the surface of the organic insulation layer 120 on the substrate 110. Portions of the organic insulation layer 120 are removed according to a laser transmissive ratio of the half-tone mask 130 to form a lens shape on the surface of the organic insulation layer 120. Reference number 135 refers to portions of the laser that are diffracted by a half-tone pixel 137 formed at the half-tone mask 130. As shown in FIG. 3B, the half-tone mask 130 includes a plurality of half-tone pixels 137. As shown in FIG. 3C, the half-tone pixel 137 includes a laser transmissive area 139 and a laser non-transmissive area 138.

Thus, a laser transmissive ratio of the half-tone mask 130 depends on a ratio of the laser transmissive area 139 to the laser non-transmissive area 138 of the half-tone pixel 137, and the lens shape is defined according to the laser transmissive ratio.

Figure 4:
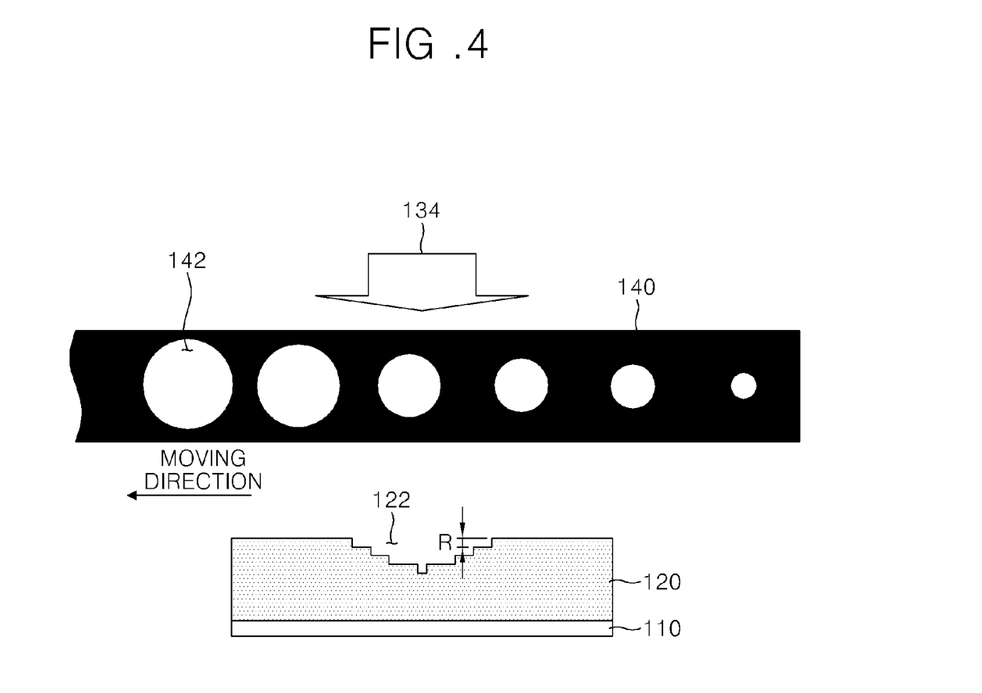
FIG. 4 is a plan view showing a synchronized imaging system method used in forming the lens shape in FIG. 1.

FIG. 4 is a plan view showing a synchronized imaging system method used in the step of forming the lens shape S110 in FIG. 1. As shown in FIG. 4, in the synchronized imaging system method, a laser 134 is irradiated on the surface of the organic insulation layer 120 through the synchronized imaging mask 140. The synchronized imaging mask 140 includes a plurality of different-sized transmissive holes 142.

The synchronized imaging mask 140 is moved in a direction in which the size of the transmissive holes 142 increases in sequence, and the laser 134 is irradiated on the surface of the organic insulation layer 120. The surface of the organic insulation layer 120 is removed at a constant removing ratio according to the size of each transmissive hole 142. The removing ratio is defined as thickness R, which is a thickness of the organic insulation layer 120 that is removed by a laser shot. A laser shot is defined as an irradiating unit that is irradiated on the surface of the organic insulation layer 120 by the laser 134 through one of the transmissive holes 142.

When the synchronized imaging mask 140 is moved in the direction in which the size of the transmissive holes 142 decreases in sequence, a concave lens shape 122 is formed on the surface of the organic insulation layer 120. To the contrary, when the synchronized imaging mask 140 is moved in the direction, in which the size of the transmissive holes 142 increases in sequence, a convex lens shape (not shown) may be formed on the surface of the organic insulation layer 120.

Moreover, when the synchronized imaging mask 140 is moved in the direction in which the size of the transmissive holes 142 increases or decreases at random, a lens of an asymmetric shape or a hybrid shape mixed with a concave shape and a convex shape may be formed on the surface of the organic insulation layer 120. The minimum thickness R that may be removed by one laser shot is limited in the synchronized imaging system method, so the method may be adaptable when an aspect ratio of an implementing lens is large.

Figure 5A:
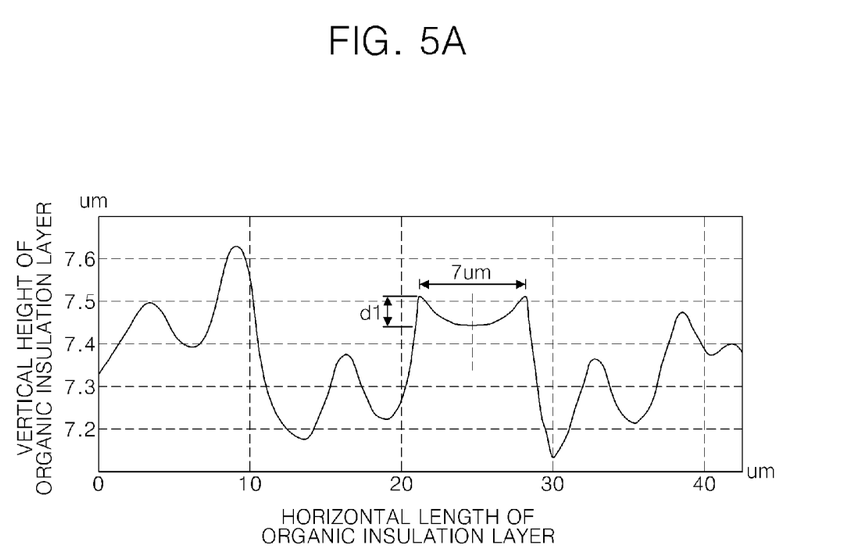
FIG. 5A, FIG. 5B, and FIG. 5C are cross-sectional views showing the lens shape formed by the method in FIG. 3 and FIG. 4.
Figure 5B:
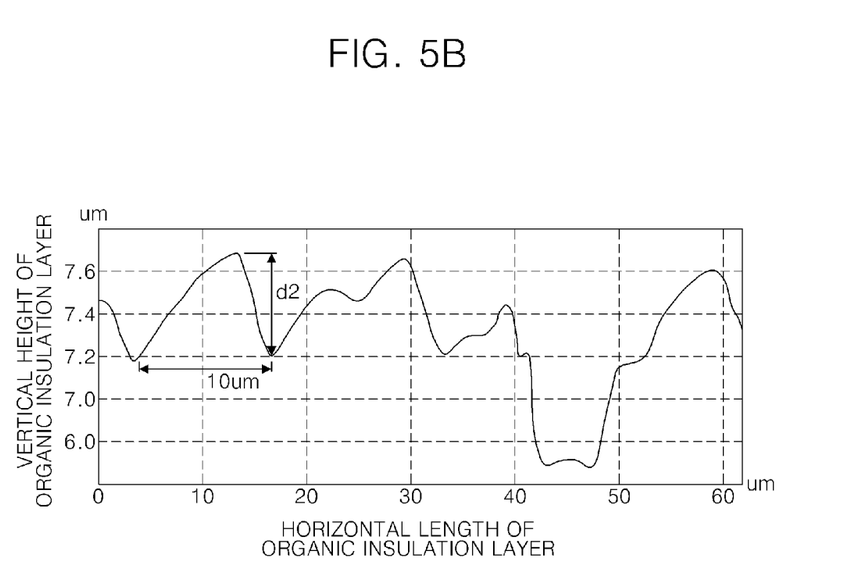
Figure 5C:
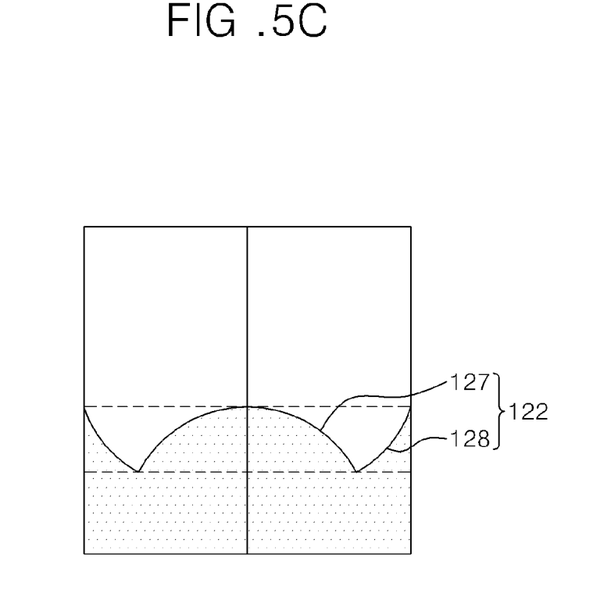

FIG. 5A, FIG. 5B, and FIG. 5C are cross-sectional views showing the lens shape formed by the method in FIG. 3 and FIG. 4. The X axis is defined as a length of the organic insulation layer in a horizontal direction, and the Y axis is defined as a height of the organic insulation layer in a vertical direction. Referring to FIG. 5A, which shows a lens shape formed as a design specification of a fine symmetric concave lens having a 7 um diameter, the lens shape formed on the organic insulation layer includes a fine diameter and a symmetric concave shape which may be substantially the same as the design specification. Reference symbol d1 is defined as a depth of the concave lens.

Referring to FIG. 5B, which shows a lens shape formed as a design specification of an asymmetric convex lens having a 10 um diameter, the lens shape formed on the organic insulation layer includes a fine diameter and an asymmetric convex shape, which are substantially the same as the design specification. Reference symbol d2 is defined as a depth of the convex lens.

A hybrid lens shape 122 mixed with the concave lens 128 and the convex lens 127 is shown in FIG. 5C. The fine concave shape, the asymmetric shape, and the hybrid shape shown in FIG. 5A, FIG. 5B, and FIG. 5C, respectively, are lens shapes that may greatly improve the transmissive ratio in a design. When a lens having a fine concave shape, an asymmetric shape, or a hybrid shape is formed on the surface of the protective layer of the transflective LCD apparatus through the conventional photolithography process, a technical and economical problem may be caused. However, a fine concave shape, an asymmetric shape, or a hybrid shape may easily be implemented on the surface of the protective layer of the transflective LCD apparatus when the lens forming master is manufactured according to exemplary embodiments of the present invention.

A lens having a fine concave shape, an asymmetric shape, or a hybrid shape that is implemented on the surface of the protective layer of the transflective LCD apparatus may have substantially half of the depth of a lens produced according to a conventional photolithography process. Thus, it may be easier to achieve a desired lens shape and the reflective ratio may be increased by increasing an effective incident angle.

By measuring the reflective ratio, for example, through a spot method or an integral sphere, the concave lens formed according to the exemplary embodiments of the present invention may increase the reflective efficiency of the lens by 60% as compared to a lens formed by the conventional method. The reflective ratio of the incident light into the reflective area through a straight light source is measured in the spot method, and the reflective ratio of the incident light into the reflective area through lights in various directions is measured in the integral sphere method.

Figure 6:
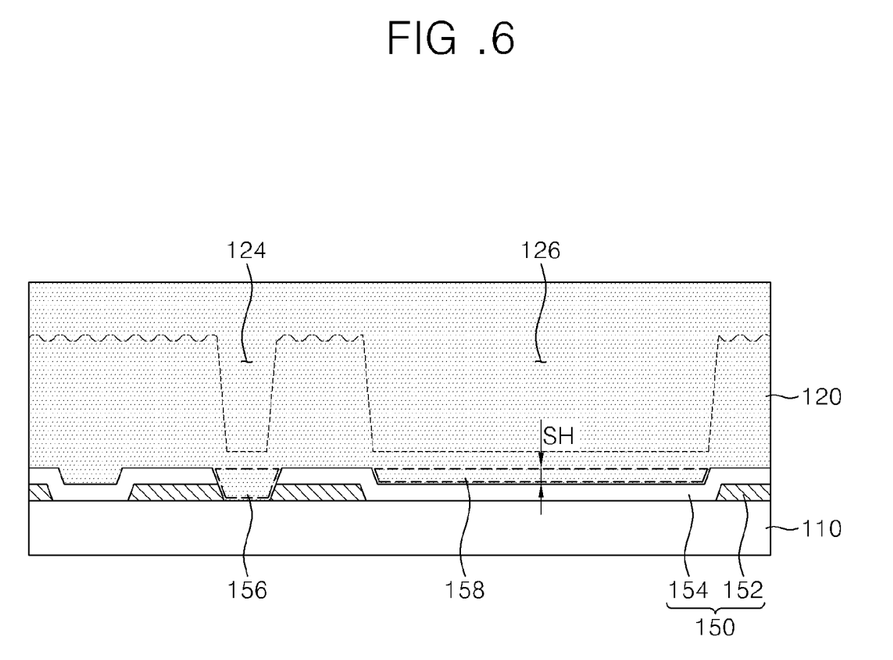
FIG. 6 is a cross-sectional view showing a method of forming the organic insulation layer in FIG. 1 according to another exemplary embodiment of the present invention.

FIG. 6 is a cross-sectional view showing another exemplary embodiment of forming the organic insulation layer in FIG. 1. As shown in FIG. 6, forming the organic insulation layer S100 may further include forming an align pattern. The align pattern 150 is a pattern formed between the organic insulation layer 120 and the substrate 110 to align the laser process.

The area where the uniformity of the laser intensity may be maintained is small in the laser removing process, so the number of times the step and repeat process is performed is increased when manufacturing a flat display, such as the LCD apparatus, which may cause misalignment.

For example, the contact hole 124 formed in the organic insulation layer 120 may require more laser processes than the lens shape forming process. When the contact hole 124 is misaligned, a contact hole that is formed correspondingly to the contact hole 124 may be formed at an abnormal position on the protective layer of the TFT substrate (not shown). This can prevent the drain electrode and the pixel electrode from being properly connected, which may cause a pixel failure.

The align pattern 150 may provide a standard to monitor an alignment status at every step or at a specific period, which may prevent misalignment due to a laser process characteristic.

The align pattern 150 includes a first align layer 152 and a second align layer 154. The area where the first align layer 152 and the second align layer 154 deposited on the first align layer 152 are completely removed may be used as a pattern to align the contact hole 124. Moreover, an area where only the second align layer 154 is formed may be used as a pattern to align the bank area 126. For example, the pattern to align the bank area 126 may use a step height SH from the area where both of the first align layer 152 and the second align layer 154 are deposited to the area where only the second align layer 154 is formed. The area where both of the first align layer 152 and the second align layer 154 are formed may be a peripheral area of the bank area.

Figure 7:
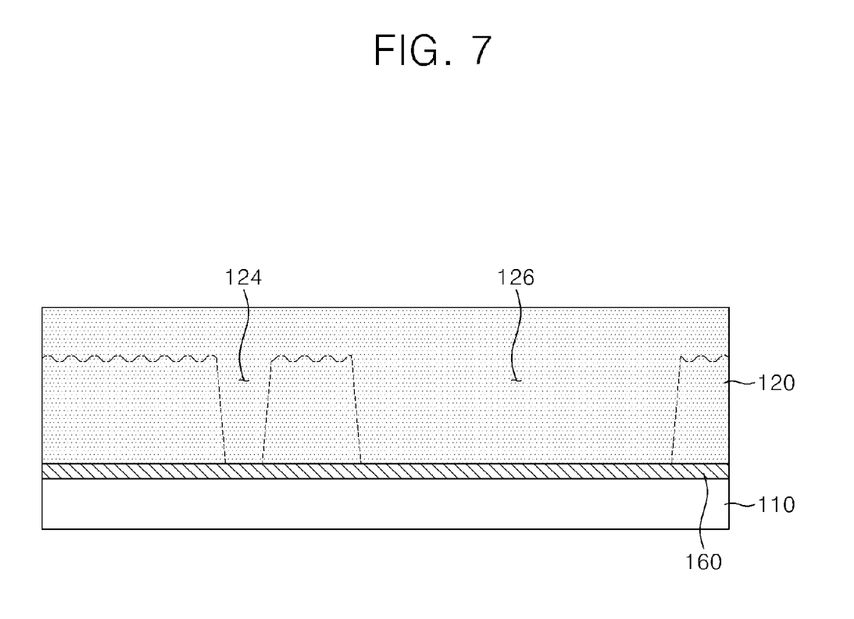
FIG. 7 is a cross-sectional view showing a method of forming the organic insulation layer in FIG. 1 according to another exemplary embodiment of the present invention.

FIG. 7 is a cross-sectional view showing a method of forming the organic insulation layer in step S100 of FIG. 1 according to another exemplary embodiment. As shown in FIG. 7, forming the organic insulation layer may further include forming a barrier layer 160. The barrier layer 160 is a layer formed between the organic insulation layer 120 and the substrate 110 to protect a distortion generated at a bottom surface of the contact hole 124 and the bank area 126 due to the laser process.

The laser process may distort the shape of the bottom surface according to a depth when the bottom surface of the contact hole 124 and the bank area 126 is processed because a transient area of the laser intensity may be generated at an edge of the processed pattern.

Thus, a flat barrier layer 160 may include an inorganic material, for example, silicon nitride ($SiN_x$) or silicon oxide ($SiO_x$), which is not removed by a laser process between the organic insulation layer 120 and the substrate 110, thereby preventing distortion of the bottom surface caused by the laser process.

Figure 8:
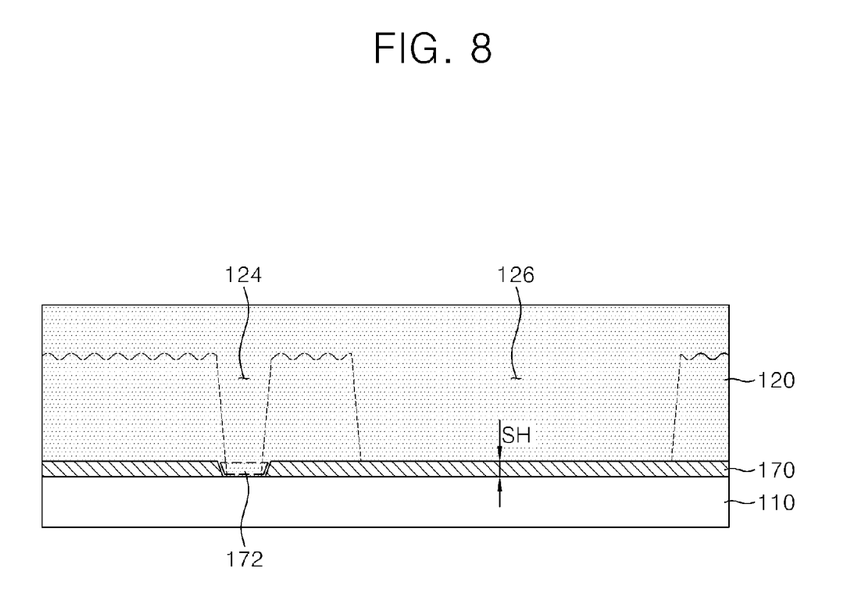
FIG. 8 is a cross-sectional view showing a method of forming the organic insulation layer in FIG. 1 according to another exemplary embodiment of the present invention.

FIG. 8 is a cross-sectional view showing a method of forming the organic insulation layer in step S100 of FIG. 1 according to another exemplary embodiment. As shown in FIG. 8, forming the organic insulation layer may further include forming a step height adjusting pattern 170. The step height adjusting pattern 170 is a layer formed between the organic insulation layer 120 and the substrate 110 to adjust a height of the organic insulation layer 120 when the step height SH exists at the bottom surface of the contact hole 124 and the bank area 126 that will be processed by the laser process.

For example, when the bottom surface of the contact hole 124 is higher than the bottom surface of the bank area 126, the step height adjusting pattern 170 may include an opening 172 in an area corresponding to the contact hole 124, and the step height adjusting pattern 170 may not include any openings in an area corresponding to the bank area 126.

The organic insulation material remaining in the contact hole when the protective layer of the transflective LCD apparatus is imprinted by an imprinting mold may be removed using the step height adjusting pattern 170, which may assure that the drain electrode of the TFT is connected to the pixel electrode.

Figure 9A:
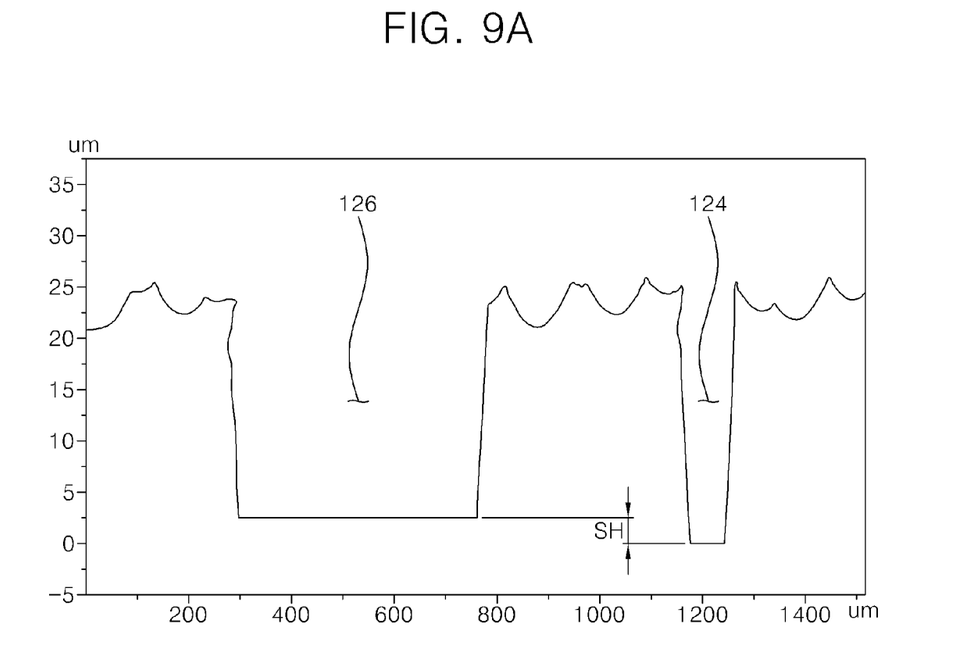
FIG. 9A, FIG. 9B, and FIG. 9C are cross-sectional views showing profiles of the contact hole and the bottom surface of the bank area formed by the method for manufacturing the lens forming master including forming the organic insulation layer in FIG. 8.
Figure 9B:
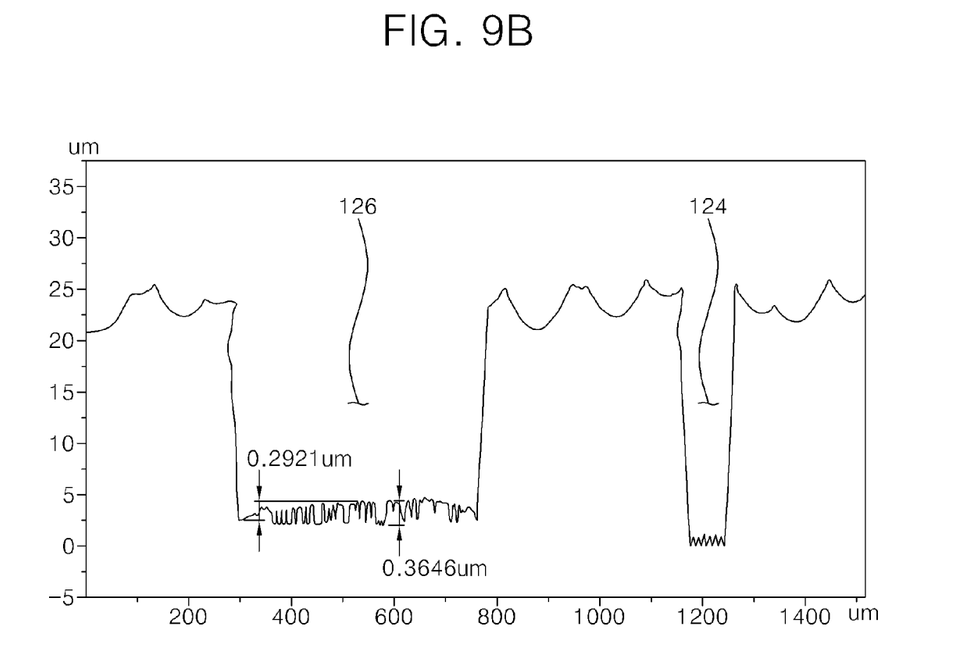
Figure 9C:
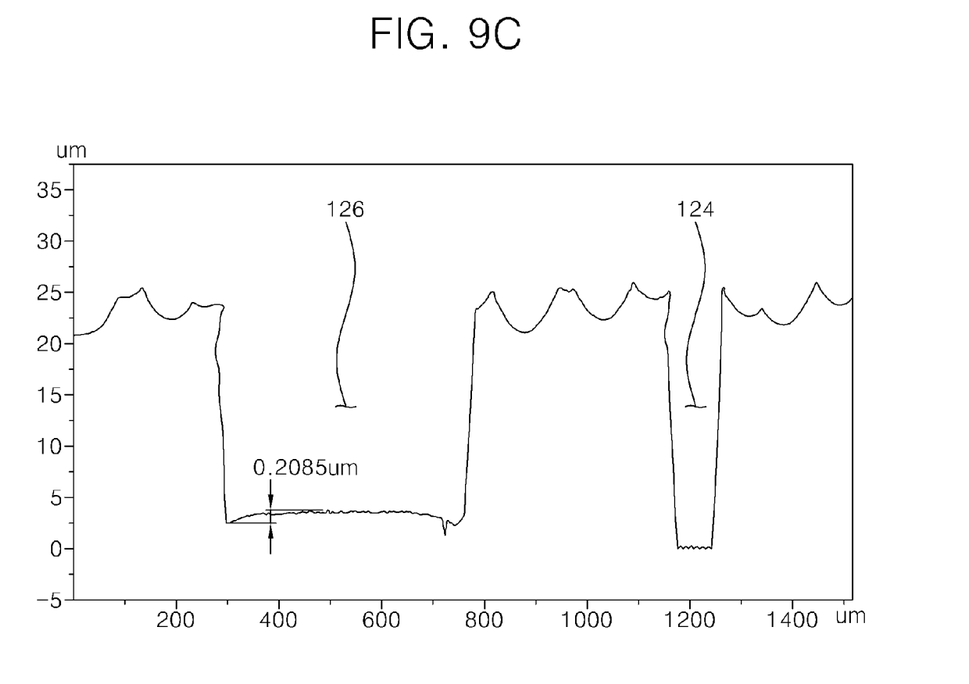

FIG. 9A, FIG. 9B, and FIG. 9C are cross-sectional views showing profiles of the contact hole and the bottom surface of the bank area formed by the method for manufacturing the lens forming master shown in FIG. 8. FIG. 9A shows a profile of the bottom surface of the contact hole and the bank area according to a design specification. Referring to FIG. 9A, the bottom surface of the contact hole 124 and the bank area 126 is flat and has a constant step height in accordance with the design specification.

FIG. 9B shows a profile of the bottom surface of the contact hole and the bank area processed by the laser process in accordance with the design specification. Referring to FIG. 9B, the bottom surface of the contact hole 124 and the bank area 126 processed by the laser process in accordance with the design specification has a constant distortion according to a laser process characteristic. The distortion may be formed more at the bank area 126, which has an area processed by the laser that is larger than the contact hole 124. The non flatness of the bottom surface of the bank area 126 about 0.2921 um, and the roughness is about 0.3646 um. The non flatness is the height of the bottom shape which derails a reference line, and the roughness is the gap between a maximum peak and a minimum peak of the shape of the bottom surface.

FIG. 9C shows a profile of the bottom surface of the contact hole and the bank area when the organic insulation layer including the barrier layer is processed by the laser process in accordance with the design specification. Referring to FIG. 9C, the bottom surface of the contact hole 124 and the bank area 126 processed by laser in accordance with the design specification has a reduced distortion compared to the distortion in FIG. 9B. The non flatness of the bottom surface of the bank area is about 0.2085 um, and the roughness is reduced to a very small amount.

Figure 10:
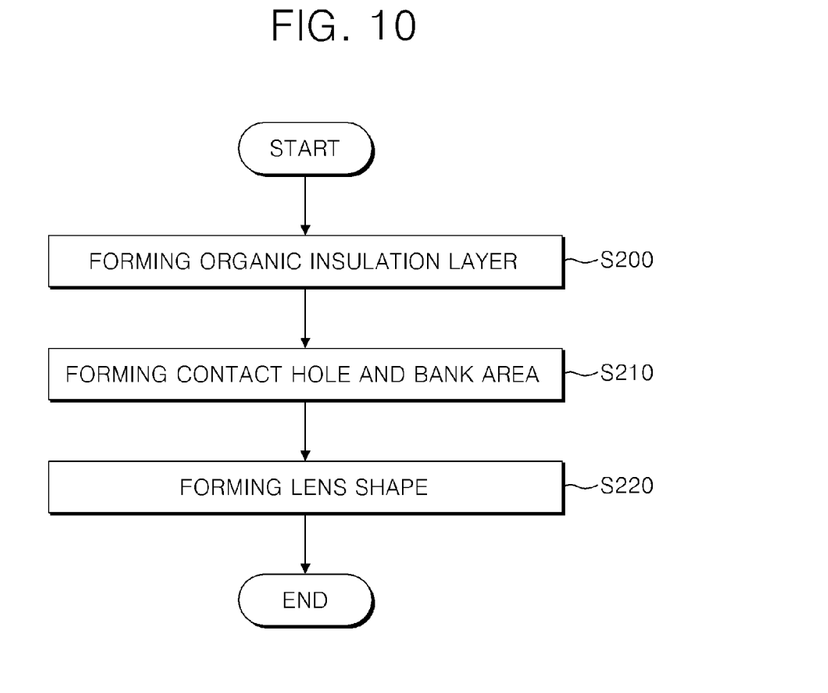
FIG. 10 is a flow chart showing a method of forming a lens forming master according to a second exemplary embodiment of the present invention.
Figure 11A:
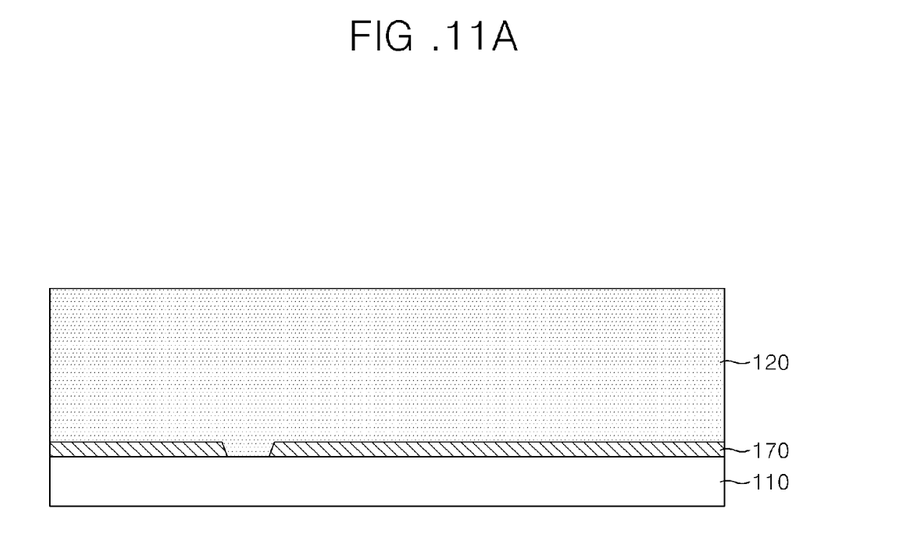
FIG. 11A, FIG. 11B, and FIG. 11C are cross-sectional views showing the method for manufacturing the lens forming master in FIG. 10.
Figure 11B:
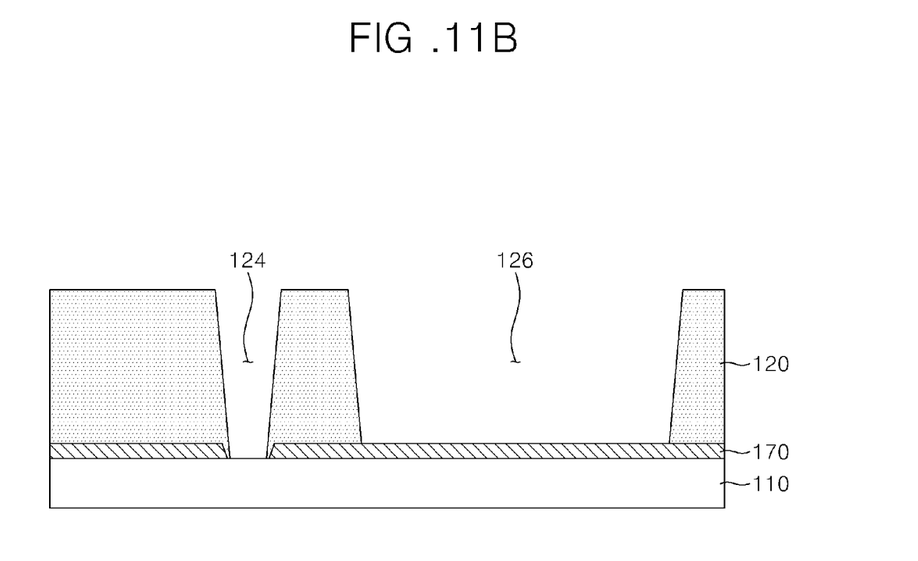
Figure 11C:
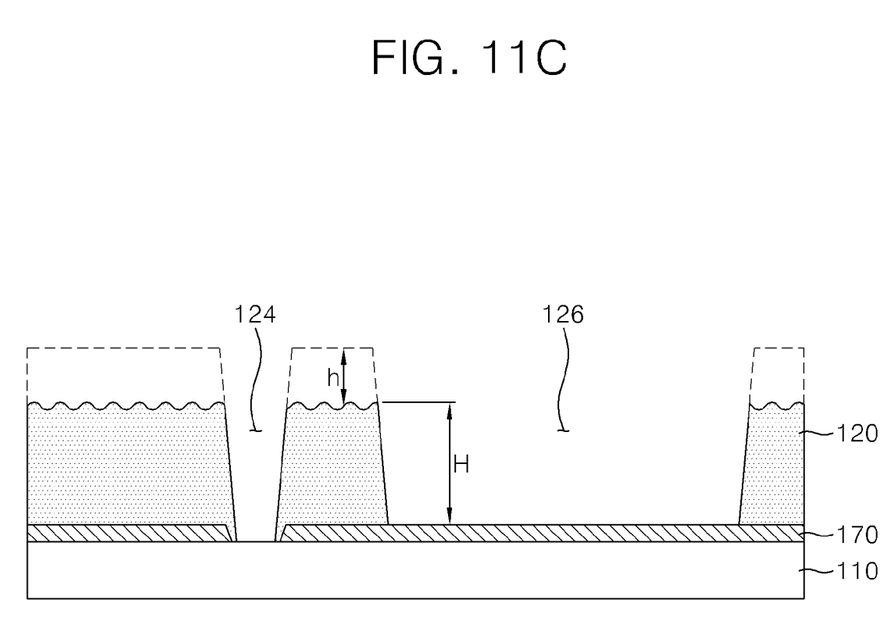

FIG. 10 is a flow chart showing a method of forming a lens forming master according to a second exemplary embodiment of the present invention. FIG. 11A, FIG. 11B, and FIG. 11C are cross-sectional views showing the method for manufacturing the lens forming master in FIG. 10. As shown in FIG. 10, the second exemplary embodiment of a method for manufacturing a lens forming master by mixing a photolithography method and a laser removing process includes forming an organic insulation layer S200, forming a contact hole and a bank area S210, and forming lens shape S220.

As shown in FIG. 11A, forming the organic insulation layer S200 includes forming a step height adjusting pattern 170 to adjust the step height and coating an organic insulation material on a substrate 110 to form an organic insulation layer 120. The organic insulation material may include an acrylic resin having photosensitivity.

Portions of the organic insulation layer 120 are removed through a laser process to form a lens shape after forming a contact hole 124 and a bank area 126 by a photolithography process. Thus, the organic insulation layer 120 may be formed to have a precise coating thickness to form a thickness h of the organic insulation layer and a depth H of the bank area 126, which will be removed by the laser in accordance with the design specification. Since the other processes are substantially the same as with forming the organic insulation layer shown in FIG. 1 and FIG. 2A, a detailed description thereof will be omitted.

As shown in FIG. 11B, forming the contact hole 124 and the bank area 126 S210 includes performing a photolithography process using a mask having patterns of a contact hole 124 and a bank area 126 to form the contact hole 124 and the bank area 126.

Forming the contact hole 124 and the bank area 126 through the photolithography process before the lens shape is formed on the organic insulation layer 120 is different from the first exemplary embodiment, in which the lens shape is formed before forming the contact hole and bank area.

As shown in FIG. 11C, forming the lens shape S220 includes removing a portion of the organic insulation layer 120 using a laser irradiated through a mask to form the lens shape 122 on the surface of the organic insulation layer 120. The area with a dotted line denotes the organic insulation material removed by the laser. Since the other processes are substantially the same as forming the lens shape S110 shown in FIG. 1 and FIG. 2B, a detailed description thereof will be omitted.

The method for manufacturing the lens forming master in accordance with the second exemplary embodiment may be used to form a contact hole 124 that needs higher alignment accuracy than other patterns on the organic insulation layer 120.

Figure 12:
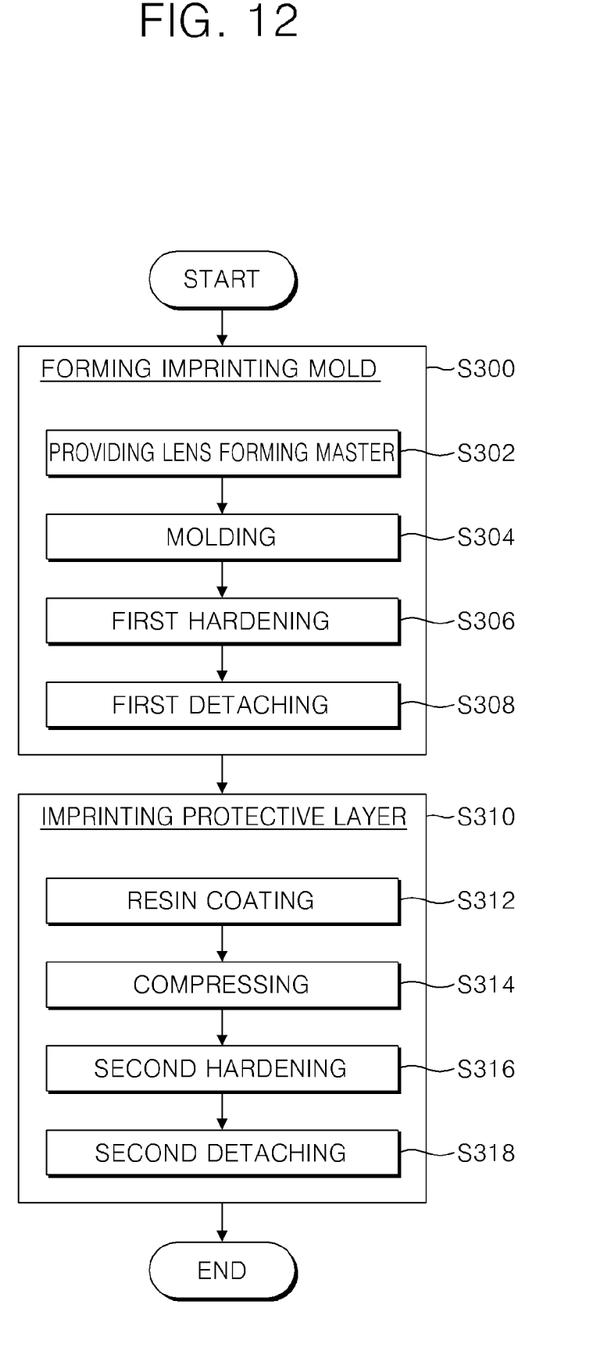
FIG. 12 is a flow chart showing a method for manufacturing a thin-film transistor ("TFT") substrate using a lens forming master according to a third exemplary embodiment of the present invention.

FIG. 12 is a flow chart showing method for manufacturing a TFT substrate using a lens forming master according to a third exemplary embodiment of the present invention. As shown in FIG. 12, the third exemplary embodiment includes forming an imprinting mold S300 and imprinting a protective layer S310.

Forming the imprinting mold S300 includes forming the imprinting mold using the lens forming master. Forming the imprinting mold S300 includes forming the lens forming master S302, molding S304, first hardening S306, and first detaching S308.

In forming the lens forming master S302, the lens forming master is provided on a working stage. The lens forming master may include an organic insulation layer where a fine concave shape, an asymmetric shape, or a hybrid shape is formed in accordance with the first exemplary embodiment or the second exemplary embodiment of the present invention. Molding S304 includes coating an elastic material on the lens forming master provided in forming the lens forming master S302. The elastic material may include an elastomer. In first hardening S306, the coated elastic material is hardened. In first detaching S308, the hardened elastic material is separated from the lens forming master.

Imprinting the protective layer S310 includes imprinting a surface of the protective layer of the transflective LCD apparatus on the lens forming master as a patterned shape using the imprinting mold which is manufactured in forming the imprinting mold S300. Imprinting the protective layer S310 includes coating a resin S312, compressing S314, second hardening S316, and second detaching S318.

Coating the resin S312 includes coating an organic insulation material on a TFT substrate to form a protective layer. The organic insulation material may be coated by a spin coating method or a slit coating method. The TFT substrate may be a substrate including a gate line, a data line, and a TFT connected to the gate line and the data line.

Pressing S314 includes pressing the surface of the protective layer of the TFT substrate using the imprinting mold to form a shape corresponding to a pattern of the imprinting mold. Second hardening S316 includes irradiating ultraviolet (UV) rays to the protective layer that has been pressed by the imprinting mold, thereby curing the protective layer. Second detaching S318 includes separating the imprinting mold from the TFT substrate, so that the TFT substrate has a protective layer with substantially the same shape as the lens forming master.

Thus, in the TFT substrate manufactured according to exemplary embodiments of the present invention, a lens of a fine concave shape, an asymmetric shape, or a hybrid shape is formed on the surface of the protective layer in the reflection area, and the lens may be more easily formed and manufactured at a lower cost than that of a conventional photolithography method.

Figure 13:
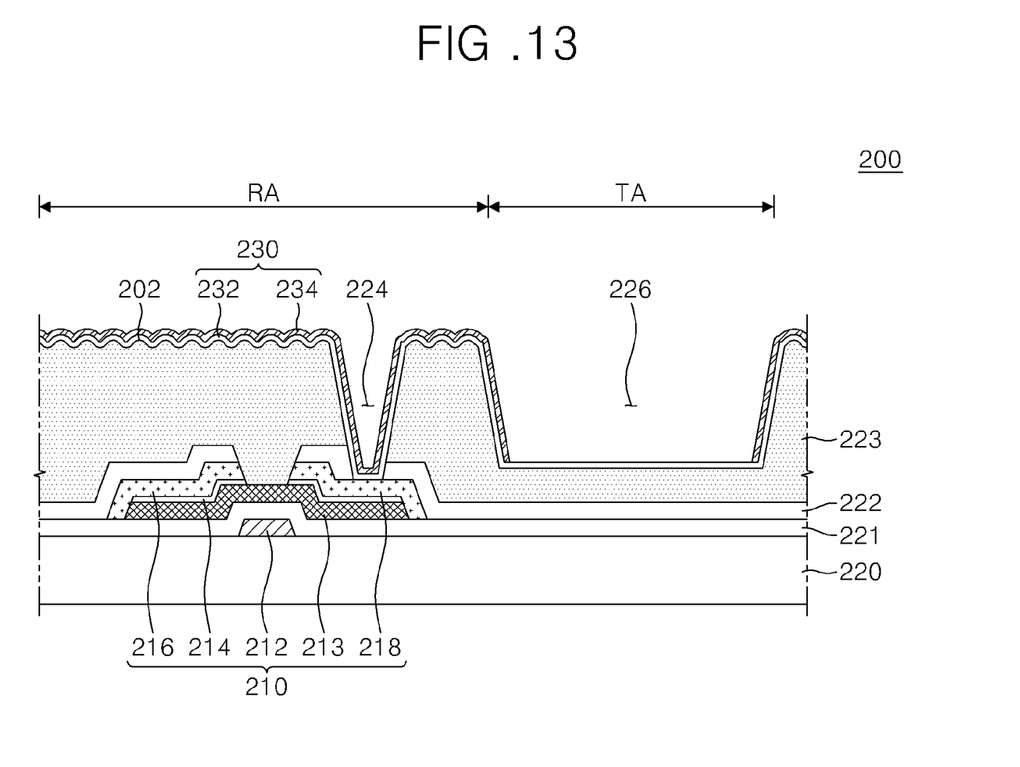
FIG. 13 is a cross-sectional view showing the TFT substrate formed by the method for manufacturing the TFT substrate using the lens forming master in FIG. 12.

FIG. 13 is a cross-sectional view showing the TFT substrate formed by the method for manufacturing the TFT substrate using the lens forming master in FIG. 12. As shown in FIG. 13, a TFT substrate 200 in accordance with exemplary embodiments of the present invention includes a shape of a lens 202 that is formed according to a shape of an imprinting mold on a surface of a protective layer 223 in a reflection area RA.

A pixel electrode 230 may be further formed at an upper portion of the protective layer 223, on which the shape of the lens 202 is formed. The pixel electrode 230 is connected to either a source electrode 216 or a drain electrode 218 of a thin film transistor 210 through a contact hole 224. FIG. 13 shows the pixel electrode 230 connected to the drain electrode 218 through the contact hole 224. The pixel electrode 230 may include a transparent electrode 232 and a reflection electrode 234. The transparent electrode 234 extends from a bottom surface of a bank area 226 and works as an electrode facing a common electrode (not shown) in a transmission area TA. The reflection electrode 234 is formed in the reflection area RA of an upper portion of the transparent electrode 232 and works as an electrode facing a common electrode in the reflection area RA.

The TFT substrate 200 may be used as a component of an LCD apparatus along with a color filter substrate (not shown) and liquid crystal (not shown). A color filter and a common electrode may be formed on the color filter substrate, and the liquid crystal may be injected between the TFT substrate 200 and the color filter substrate.

Reference numbers 212, 213, and 214 are a gate electrode of the TFT 210, an active layer of the TFT 210, and an ohmic contact layer, respectively. Moreover, reference numbers 220, 221, and 222 are a glass substrate, a gate insulation layer, and an inorganic protective layer, respectively.

As mentioned above, in a method for manufacturing a lens forming master and a method for manufacturing a TFT substrate of the present invention, the lens forming master is manufactured by a laser, an imprinting mold that transfers the lens forming master is manufactured, and a lens shape is formed on a protective layer in a reflection area using the imprinting mold.

Thus, in the method for manufacturing the lens forming master and the method for manufacturing the TFT substrate of the present invention, a lens having a complex shape may be easily formed on the protective layer in the reflection area. In manufacturing a TFT substrate that improves a reflection ratio, various limitations in a conventional photolithography method regarding a lens shape, process uniformity, and reproducibility may be overcome.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a thin film transistor substrate, comprising:
    removing a portion of an organic insulation layer with a laser irradiated through a mask to form a lens forming master having a lens shape on a surface of an organic insulation layer;
    coating and hardening an elastic material on the surface of the organic insulation layer and detaching the hardened elastic material from the lens forming master to form an imprinting mold having the lens shape on the surface of the organic insulation layer;
    coating an organic insulation material on a thin film transistor substrate to form a protective layer; and
    compressing the surface of the protective layer of the thin film transistor substrate using the imprinting mold to form a shape corresponding to the lens shape of the imprinting mold.

2. The method of claim 1, wherein removing a portion of an organic insulation layer comprises forming the lens shape on the surface of the organic insulation layer corresponding to a reflective area of a transflective liquid crystal display apparatus.

3. The method of claim 1, wherein removing a portion of an organic insulation layer comprises forming a bank area on the organic insulation corresponding to a transmissive area of a transflective apparatus.

4. The method of claim 1, wherein removing a portion of an organic insulation layer comprises forming a contact hole in the organic insulation layer corresponding to a hole connecting a drain electrode of a thin film transistor and a pixel electrode of a transflective liquid crystal display apparatus.

5. The method of claim 1, wherein removing a portion of an organic insulation layer comprises a half-tone mask method, in which the laser irradiated through a half-tone mask is irradiated onto the portion of the organic insulation layer through a focus lens.

6. The method of claim 5, wherein the half-tone mask comprises a plurality of half-tone pixels, each half-tone pixel being divided into a laser transmissive area and a laser non-transmissive area.

7. The method of claim 1, wherein removing a portion of an organic insulation layer comprises a synchronized imaging system method, in which the laser is irradiated onto the portion of the organic insulation layer through the synchronized imaging mask including a plurality of different-sized transmissive holes.

8. The method of claim 7, wherein removing a portion of an organic insulation layer comprises irradiating the laser onto the portion of the organic insulation layer through the transmissive holes by moving the synchronized imaging mask to change sizes of the transmissive holes.

9. The method of claim 1, further comprising:
hardening the protective layer having the shape corresponding to the lens shape of the imprinting mold.

* * * * *